Aug. 17, 1937.  W. OLSON  2,090,374
HOSE CLAMP
Filed Feb. 26, 1935
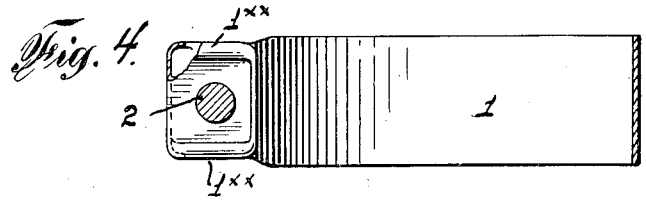
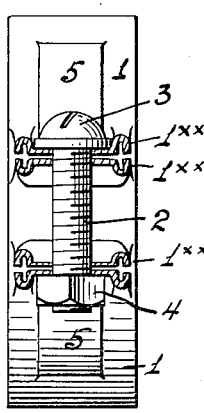
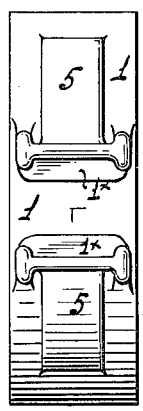
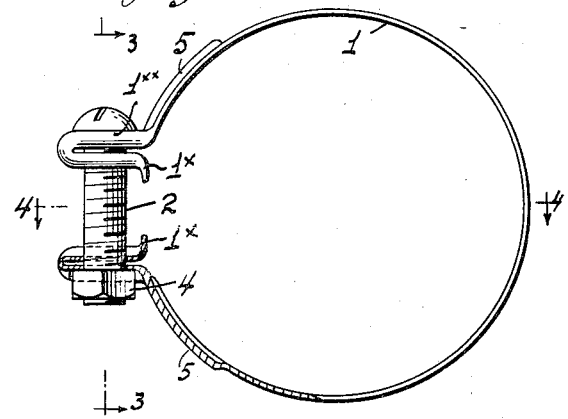
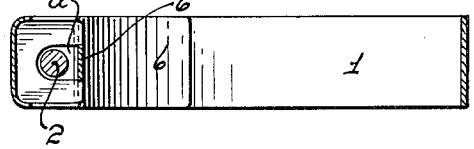
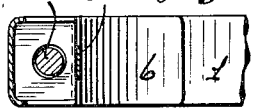
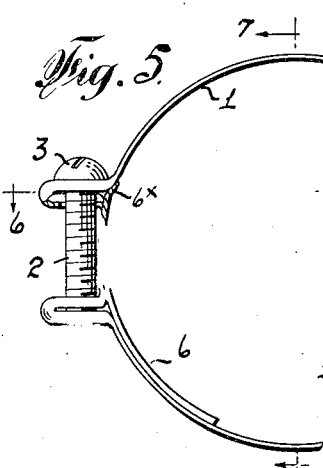
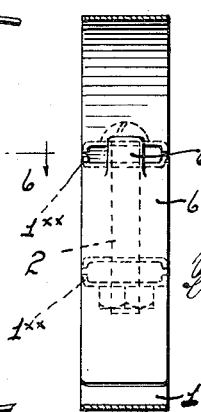
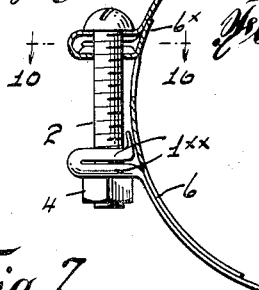
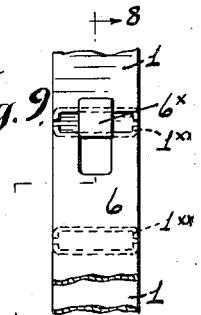
INVENTOR.
William Olson
BY
ATTORNEY Patented Aug. 17, 1937

2,090,374

UNITED STATES PATENT OFFICE 2,090,374

HOSE CLAMP

William Olson, Brooklyn, N. Y.

Application February 26, 1935, Serial No. 8,272

1 Claim. (Cl. 24—19)

The object of the invention is to provide a clamp for hose connections and the like, so designed that the clamp may be given relatively great tightening stresses by means of a tightening bolt without tearing the metal of the clamp or bending the walls of the clamp abutted by the bolt and nut commonly used for the tightening operation, means also being provided in one embodiment of the invention for protecting the hose against any cutting action of the clamp at points underlying the bolt. These and other objects of the invention will be described in the specifications with reference to the accompanying drawing, in which—

Fig. 1 is a front elevation, partly in section, on the line 1—1, Fig. 2, of an embodiment of the invention.

Fig. 2 is a plan view of the structure shown in Fig. 1 with the bolt removed.

Fig. 3 is a view similar to Fig. 2, showing the bolt engaging flanges in horizontal section and a bolt and nut in position.

Fig. 4 is a transverse section on the line 4—4, Fig. 1, looking in the direction of the arrow.

Fig. 5 is a fragmentary view in elevation of a modification.

Fig. 6 is a transverse sectional view on the line 6—6, Fig. 5, looking in the direction of the arrow.

Fig. 7 is a sectional elevation taken on the line 7—7, Fig. 5.

Fig. 8 is a fragmentary sectional elevation on the line 8—8, Fig. 9.

Fig. 9 is a fragmentary elevation looking at the inner face of the structure shown in Fig. 8.

Fig. 10 is a horizontal section on the line 10—10, Fig. 8.

Referring to Figs. 1 to 4 inclusive, the clamp therein shown comprises a strip of sheet metal 1 bent in annular formation. Each end section of the strip is bent outwardly and thence downwardly to form opposed wall sections which are initially substantially spaced from each other, the free end being then bent in conformity with the annular major wall of the strip to provide a foot 1x. The side walls of the two-part flange projection thus formed are bent toward each other to form reinforcing side flanges 1xx. Intermediate the flanges 1xx at the sides of the said clamp end sections, the walls may be moved toward each other and apertured, as at a, Fig. 6 to receive a bolt 2 having a head 3, the bolt being threaded to receive a nut 4. Thus, in effect, each projected and double bolt receiving flange is ribbed at its sides (see Fig. 2). If desired, the metal of the strip at each end section may be formed with a reinforcing rib 5. Heretofore in structures of the type, the operation of the bolt securing together the two ends of the clamp has tended to bend the bolt receiving flanges when the clamp reached a certain degree of tightening upon the hose or other connection. Continued tightening of the bolt thus caused the latter to exert a shearing action upon the walls of the flanges adjacent the bolt and further tightening ruined the clamp. In my construction however, the rib sides of the flanges, carrying bending stresses down to the foot 1x effectively resist bending of the clamp at its bolt receiving areas, and in a tightening operation the flanged ends are moved toward each other in substantially a straight line so that the bolt receiving holes remain with their axes coincident with the axis of the bolt and there is no shearing action upon the clamp walls.

My invention may be employed in connection with a closure for the gaps normally lying intermediate the flanged ends of the clamp and at the spaced walls at the base of each multi-wall flange, as shown in Figs. 6 to 10 inclusive. In such construction one of the feet 1x of Fig. 1 may be continued in curved form so as to underlie the space intermediate the outstanding flanges, such continuation being indicated at 6. The U-shaped cut may be made in extension 6 and the metal bounded by the cut reversely bent to form a lip 6x to bridge receiving flange. The lip 6x in conjunction with the extension 6 facilitates the movement of the clamp at that area underlying the bolt by bridging gaps bounded by metallic elements of the clamp which would otherwise cut into the relatively soft hose material during the tightening operation, and this is accomplished without the use of any gap closure elements separate from the clamp itself.

In the modification of Fig. 5, it will be noted that the nut 4 is held intermediate the walls of the left hand multi-wall flange and the end section of the strip at such point is reversely bent so as to extend below and bridge the spaced walls of the flange structure to retain the nut and as a further reinforcement. It will be noted that the enclosed nut is held against rotation by the bent side margins of each set of opposed wall sections comprising the flange structure and the clamp may be applied with an ordinary screw driver acting upon the bolt which has a slotted end.

Having described my invention, what I claim and desire to secure by Letters Patent, is as follows:—

A hose clamp comprising an annular strip of metal, each end section of the strip extending outwardly substantially at right angles to the main body of the strip and thence extending inwardly to form a multi-wall flange, the side margins of the two walls of each flange extending away from each other and thence toward each other to form reinforcing double wall supplementary flanges, and a foot carried by each end section of the strip, the foot extending substantially at right angles to the said supplementary flanges, the feet being directed toward each other.

WILLIAM OLSON.